United States Patent [19]

Gavin et al.

[11] 4,413,089
[45] Nov. 1, 1983

[54] USE OF IRON OXIDE PIGMENTS IN A POLYMETHYL METHACRYLATE ARTICLE

[75] Inventors: Francis M. Gavin, Chadds Ford; Anne M. Kruglewicz, Aston, both of Pa.

[73] Assignee: E. I. Du Pont de Nemours and Company, Wilmington, Del.

[21] Appl. No.: 356,717

[22] Filed: Mar. 10, 1982

[51] Int. Cl.$^3$ ................................................ C08K 3/10
[52] U.S. Cl. ........................................ 524/785; 524/435; 524/437; 524/560; 524/786; 524/853
[58] Field of Search ............... 524/435, 437, 560, 785, 524/853, 786

[56] References Cited

U.S. PATENT DOCUMENTS

| | | | |
|---|---|---|---|
| 3,706,825 | 12/1972 | Hall et al. ............................ | 264/75 |
| 3,780,156 | 12/1973 | Cameron ............................. | 524/786 |
| 3,827,933 | 8/1974 | Duggins et al. ..................... | 428/220 |
| 3,847,865 | 11/1974 | Duggins ............................... | 524/437 |
| 4,085,246 | 4/1978 | Buser et al. ......................... | 428/220 |
| 4,145,477 | 3/1979 | Smiley ................................. | 428/515 |
| 4,159,301 | 6/1979 | Buser et al. ......................... | 264/331 |
| 4,183,991 | 1/1980 | Smiley et al. ....................... | 524/430 |
| 4,185,070 | 1/1980 | Angell et al. ....................... | 264/328.12 |

FOREIGN PATENT DOCUMENTS 2342948 11/1977 France ................................ 524/560
1302403 1/1973 United Kingdom .

OTHER PUBLICATIONS

Derwent Abst. 42683 D/24 Mitsubishi Rayon (4-1981) (J56043302).
Derwent Abst. 1D113 D/07 BASF (Jan. 1981) (DS2941807).

Primary Examiner—Lewis T. Jacobs
Assistant Examiner—Herbert J. Lilling
Attorney, Agent, or Firm—William H. Thrower

[57] ABSTRACT

A dispersion of iron oxide pigments, selected according to particle size to avoid interference with desired properties is added to a polymerizable acrylic composition containing alumina trihydrate as filler. This mixture is cured to form a filled polymeric structure containing 15 to 80% by weight polymethyl methacrylate and 20 to 85% by weight alumina trihydrate with a pleasing uniform color, maintaining desired properties of machinability, translucency, and visual depth.

1 Claim, No Drawings

USE OF IRON OXIDE PIGMENTS IN A POLYMETHYL METHACRYLATE ARTICLE

BACKGROUND OF THE INVENTION

The invention relates to filled polymeric compositions formed into cast slabs, sheets, and article useful in the building arts, more particularly to polymethyl methacrylate compositions containing alumina trihydrate filler useful for construction details and applications such as kitchen counter tops and back splash panels, bathroom vanity tops and bowls, and other molded articles such as towel racks.

DESCRIPTION OF THE PRIOR ART

The preparation of filled acrylic articles utilizing alumina trihydrate as a multifunctional filler is disclosed in U.S. Pat. No. 3,847,865 issued to Ray B. Duggins on Nov. 12, 1974. The preferred polymer constituent of the filled polymeric article disclosed therein comprises a methyl methacrylate polymer including homopolymers and copolymers of methyl methacrylate with other ethylenically unsaturated compounds (e.g., vinyl acetate, styrene, alkyl acrylates, acrylonitrile, alkyl methacrylate, multifunctional acrylic monomers such as alkylene dimethacrylates and alkylene diacrylates). In addition, the polymer constituent can contain small amounts of other polymers including minor amounts of polyester. The resulting filled polymeric structure in Duggins, comprising 20 to 85%, preferably 55 to 80%, by weight of the structure, alumina trihydrate, and 15 to 80%, preferably 20 to 45%, polymethyl methacrylate, has an important combination of properties including translucency, weather resistance, resistance to staining by common household materials, and resistance to stress cracking. In addition, the cured structure can be easily machined by conventional techniques including sawing and sanding. This particular combination of properties makes such a structure particularly useful as kitchen or bathroom counter tops. Duggins discloses the preparation of a preferred polymerizable acrylic composition consisting essentially of a syrup containing methyl methacrylate polymer dissolved in monomeric methyl methacrylate (polymer-in-monomer syrup), a polymerization initiator, and alumina trihydrate. This polymerizable composition can be cast or molded and cured to produce a structure with the desired combination of properties given above.

It has been known to produce the filled polymethyl methacrylate structures in pleasing commercially reproducible, variegated patterns which closely approximate the appearance of natural stone such as marble and granite. The above referenced patent to Duggins, U.S. Pat. No. 4,159,301 issued to Kenneth Rene Buser et al. on June 26, 1979, and U.S. Pat. No. 3,706,825 issued to Nelson Lee Hall et al. provide examples of such patterns.

The property of translucency obtained in a polymethyl methacrylate structure containing alumina trihydrate as filler has proven to be a valuable property which greatly enhances the appearance of visual depth in the resulting structure. This appearance of visual depth is aesthetically pleasing and adds to consumer appeal for the structure as a kitchen or bathroom countertop, for example.

Until the present invention, however, there has been no method of producing a filled polymethyl methacrylate structure with a pleasing uniform color or hue other than white. To meet desires of consumers, of course, it is preferable to have a choice of colors. Attempts to pigment the acrylic structure created problems in that the pigmentation created an undesired level of masking which interfered with the aesthetically desirable translucency and visual depth properties of the cured structure. Additionally, in many instances the pigmented structures would "scratch white", i.e. scratches in the surface of the pigmented structure would appear white in contrast, and subsequent sanding to remove the scratches would lessen the intensity of the color rather than returning the surface to a uniform color.

SUMMARY OF THE INVENTION

A filled polymethyl methacrylate structure, with alumina trihydrate as filler, has a pleasing, uniform color obtained from iron oxide pigmentation, with no diminution in desired properties of machinablility, translucency, and visual depth. The process of obtaining this structure includes adding a dispersion of certain iron oxide pigments to a polymerizable acrylic composition, then curing to form the filled polymethyl methacrylate article of the desired uniform color. The polymerizable acrylic composition containing iron oxide pigments is also claimed.

DETAILED DESCRIPTION OF THE INVENTION

It has been found that by preparing a dispersion of iron oxide pigments, adding this dispersion to a polymerizable acrylic composition containing alumina trihydrate as filler, casting or molding this composition, then curing to form a filled polymethyl methacrylate article, there is obtained a structure with a pleasing, uniform color which has desired properties of machinability, translucency, and appearance of visual depth.

Selection of iron oxide pigments is of course important to the realization of the final color of the finished polymethyl methacrylate structure. This choice can be determined by one skilled in the art depending on the final color desired. Of essential importance to the invention herein, iron oxide pigments of a sufficiently small particle size must be selected in order to obtain a structure with desired properties. Iron oxide pigments of a smaller particle size avoid undesired masking of the translucency and visual depth desired in the finished article. Preferred iron oxide pigments have a particle size of 10 microns or less.

The iron oxide pigments must be well dispersed in a stable dispersion before addition to the polymerizable acrylic composition. The vehicle chosen for making the pigment dispersion must be carefully chosen to avoid any interference with the polymerization of the acrylic composition. The pigments can be dispersed in a polymerizable methyl methacrylate vehicle similar to that contained in the polymerizable acrylic composition, though this would lead to shelf-life problems with the pigment dispersion. If it is contemplated that the pigment dispersion would be stored for any period before addition to the polymerizable acrylic composition, it is better to select a dispersant medium that will be compatible with the acrylic composition and will not interfere with the polymerization reaction.

A preferred polymerizable acrylic composition disclosed in the above referenced patent to Duggins consists essentially of a syrup containing methyl methacrylate polymer dissolved in monomeric methyl methacrylate (polymer-in-monomer syrup), a polymerization initiator, and alumina trihydrate as filler. A measured amount of iron oxide pigment well dispersed in a suitable dispersant, for example a soybean oil epoxide resin, is mixed with the preferred acrylic composition consisting essentially of methyl methacrylate polymer-in-monomer syrup and alumina trihydrate. The resulting mixture is blended thoroughly, then cast or molded in ways known to the art, and cured to form a filled polymethyl methacrylate article of a desired uniform color, maintaining desired aesthetic properties of translucency and visual depth.

It is understood that the degree of translucency in the finished product can be adjusted to a desired level through variations in the acrylic composition. For example, inert fillers such as calcium carbonate or silicon dioxide can be used along with the alumina trihydrate additive. If desired, for example in a thin sheet of finished polymeric material, opaqueness can be achieved by the inclusion of sufficient masking pigment such as $TiO_2$ in the pigment dispersion.

EXAMPLE I

A dispersion of iron oxide pigments in soybean oil epoxide resin was prepared using the following formulation, amounts given in weight %:

48.66% soybean oil epoxide resin 42.23% fine yellow pigment, a ferric hydroxide pigment containing approximately 82.5% $Fe_2O_3$ 9.11% black iron oxide pigment containing 98% $Fe_3O_4$ A polymerizable acrylic composition consisting essentially of 60% by weight alumina trihydrate and 40% by weight methyl methacrylate polymer-in-monomer syrup was prepared in accordance with the above referenced patent to Duggins. To this composition was added 0.003 weight% of the iron oxide pigment dispersion. The mixture was blended thoroughly, then poured into a container to form a layer of approximately ⅛" thickness and allowed to cure. The resulting filled polymethyl methacrylate article had a uniform almond color, with acceptable levels of translucency and appearance of visual depth.

What is claimed is:

1. In a process for preparing a filled polymethyl methacrylate article, said article consisting essentially of 20 to 85% by weight alumina trihydrate and 15 to 80% by weight polymethyl methacrylate and having properties of translucency and an appearance of visual depth, said process comprising curing a polymerizable composition consisting essentially of polymerizable methyl methacrylate and alumina trihydrate, the improvement whereby a dispersion of iron oxide pigments having a particle size of 10 microns or less is prepared and blended thoroughly with said polymerizable composition prior to curing, whereby upon curing said article has properties of uniform color in addition to maintaining said properties of translucency and an appearance of visual depth.

* * * * *